(12) United States Patent
Quigley et al.

(10) Patent No.: US 9,357,579 B2
(45) Date of Patent: May 31, 2016

(54) METHOD AND SYSTEM FOR A HANDHELD WIRELESS COMMUNICATION DEVICE FOR CONFIGURING CONNECTION TO AND USE OF LOCAL AND REMOTE RESOURCES

(71) Applicant: BROADCOM CORPORATION, Irvine, CA (US)

(72) Inventors: Thomas Quigley, Franklin, NC (US); Alexander MacInnis, Ann Arbor, MI (US); Arya Behzad, Poway, CA (US); Jeyhan Karaoguz, Irvine, CA (US); John Walley, Ladera Ranch, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/710,189

(22) Filed: May 12, 2015

(65) Prior Publication Data

US 2015/0245404 A1 Aug. 27, 2015

Related U.S. Application Data

(63) Continuation of application No. 13/709,412, filed on Dec. 10, 2012, now Pat. No. 9,060,354, which is a continuation of application No. 11/864,407, filed on Sep. 28, 2007, now Pat. No. 8,331,334.

(60) Provisional application No. 60/951,024, filed on Jul. 20, 2007.

(51) Int. Cl.
*H04B 7/212* (2006.01)
*H04W 76/02* (2009.01)
(Continued)

(52) U.S. Cl.
CPC ........... *H04W 76/025* (2013.01); *H04L 45/302* (2013.01); *H04L 45/306* (2013.01);
(Continued)

(58) Field of Classification Search
None
See application file for complete search history.

(56) References Cited

U.S. PATENT DOCUMENTS 6,965,948 B1 11/2005 Eneborg et al.
7,072,366 B2 7/2006 Parkkinen et al.
(Continued)

FOREIGN PATENT DOCUMENTS

DE 102005031390 1/2007
EP 0844769 5/1998
(Continued)

OTHER PUBLICATIONS

European Search Report corresponding to European Patent Application Serial No. 08011184.2-2416, dated Jan. 16, 2009.
(Continued)

*Primary Examiner* — Phirin Sam
(74) *Attorney, Agent, or Firm* — Oblon, McClelland, Maier & Neustadt, L.L.P.

(57) ABSTRACT

Methods and systems for a handheld portable communication device for configuring connection to and use of local and remote resources are disclosed and may include discovering available networks and resources, establishing a route between the handheld wireless communication device and a selected one or more of the available resources via a selected one or more of the available networks based on user preference criteria stored in the handheld wireless communication device, and communicating multimedia data between the handheld wireless communication device and the selected one or more of the available resources via the established route. The established route may be dynamically adjusted, based on network availability and bandwidth. The handheld wireless communication device may communicate utilizing a plurality of wireless protocols. The preference criteria stored in the handheld wireless communication device may be dynamically adjusted. The resources may be local or remote to the handheld wireless communication device.

18 Claims, 6 Drawing Sheets

(51) Int. Cl.

| | | |
|---|---|---|
| *H04L 12/725* | (2013.01) | |
| *H04W 40/02* | (2009.01) | |
| *H04W 48/18* | (2009.01) | |
| *H04W 72/04* | (2009.01) | |
| *H04W 12/06* | (2009.01) | |
| *H04W 48/16* | (2009.01) | |
| *H04W 84/18* | (2009.01) | |
| *H04W 40/24* | (2009.01) | |

(52) U.S. Cl.
CPC ............ *H04W 12/06* (2013.01); *H04W 40/02* (2013.01); *H04W 48/16* (2013.01); *H04W 48/18* (2013.01); *H04W 72/04* (2013.01); *H04W 84/18* (2013.01); *H04W 40/248* (2013.01)

(56) References Cited

U.S. PATENT DOCUMENTS

| | | | |
|---|---|---|---|
| 7,170,857 B2 | 1/2007 | Stephens et al. | |
| 7,412,236 B1 | 8/2008 | Blight et al. | |
| 7,484,008 B1 | 1/2009 | Gelvin et al. | |
| 7,577,910 B1 * | 8/2009 | Husemann ............ | G06F 9/4445 715/744 |
| 7,634,269 B2 | 12/2009 | Gallagher | |
| 7,852,831 B2 | 12/2010 | Akbar | |
| 7,898,950 B2 | 3/2011 | Barkley et al. | |
| 7,966,382 B2 * | 6/2011 | Ahluwalia ............. | H04L 67/16 370/401 |
| 8,331,334 B2 | 12/2012 | Quigley et al. | |
| 2002/0040389 A1 * | 4/2002 | Gerba et al. ................. | 709/219 |
| 2004/0203358 A1 | 10/2004 | Anderson et al. | |
| 2004/0209569 A1 | 10/2004 | Heinonen et al. | |
| 2005/0097087 A1 | 5/2005 | Punaganti Venkata et al. | |
| 2005/0276229 A1 | 12/2005 | Torabi | |
| 2006/0026268 A1 | 2/2006 | Sanda | |
| 2006/0084417 A1 * | 4/2006 | Melpignano et al. ......... | 455/418 |
| 2006/0111112 A1 | 5/2006 | Maveddat | |
| 2006/0168203 A1 * | 7/2006 | Levillain ............ | H04L 29/06027 709/224 |
| 2006/0221919 A1 | 10/2006 | McRae et al. | |
| 2006/0251115 A1 | 11/2006 | Haque et al. | |
| 2007/0064634 A1 | 3/2007 | Huotari et al. | |
| 2007/0083470 A1 | 4/2007 | Bonner et al. | |
| 2007/0115819 A1 | 5/2007 | Stephens et al. | |
| 2007/0232358 A1 | 10/2007 | Sherman | |
| 2007/0286100 A1 * | 12/2007 | Saaranen ................ | H04L 67/16 370/260 |
| 2008/0108437 A1 | 5/2008 | Kaarela et al. | |
| 2008/0151817 A1 | 6/2008 | Fitchett et al. | |
| 2008/0160987 A1 * | 7/2008 | Wang et al. ................ | 455/422.1 |
| 2008/0247377 A1 | 10/2008 | Van Horn et al. | |
| 2008/0273682 A1 | 11/2008 | Bakker et al. | |
| 2008/0299951 A1 | 12/2008 | Karkanias et al. | |
| 2008/0307504 A1 * | 12/2008 | Cisler ................ | H04L 63/0823 726/4 |
| 2008/0311896 A1 | 12/2008 | Karaoguz et al. | |
| 2010/0183025 A1 | 7/2010 | Stephens et al. | |
| 2010/0299523 A1 * | 11/2010 | Henry et al. ................... | 713/168 |
| 2013/0034093 A1 * | 2/2013 | Levillain ........... | H04L 29/06027 370/352 |
| 2013/0137374 A1 | 5/2013 | Stephens et al. | |

FOREIGN PATENT DOCUMENTS

| | | |
|---|---|---|
| EP | 1389855 | 2/2004 |
| KR | 200570152 | 7/2005 |
| KR | 20060105415 | 10/2006 |

OTHER PUBLICATIONS

Allard et al., "Jini meets UphP: an architecture for Jimi/UPnP interoperability." Proceedings of the 2003 Symposium on Applications and the internet (SAINT03').

Bettstetter et al., "A comparison of service discovery protocols and implementation of the service location protocol," Eunice-Open European Summer School, XX,XX, Sep. 13, 2000.

Corrected European Search Report corresponding to European Patent Application Serial No. 08011184.2-2416, dated Mar. 18, 2009.

Seagate Technology LLC, Seagate D.A.V.E. (Digital Audio Video Experience) Transform the consumer experience with the Seagate D.A.V.E. design concept, Data Sheet 2007.

Seagate Technology LLC, Seagate D.A.V.E. (Digital Audio Video Experience) The portable storage platform that collects, plays and manages digital content, Product Overview 2007.

\* cited by examiner

METHOD AND SYSTEM FOR A HANDHELD WIRELESS COMMUNICATION DEVICE FOR CONFIGURING CONNECTION TO AND USE OF LOCAL AND REMOTE RESOURCES

CROSS-REFERENCE TO RELATED APPLICATIONS/INCORPORATION BY REFERENCE

The present continuation application claims the benefit of priority under 35 U.S.C. §120 to application Ser. No. 13/709,412, filed on Dec. 10, 2012,which is a Continuation of U.S. application Ser. No. 11/864,407, filed on Sep. 28, 2007, which makes reference to and claims priority to U.S. Provisional Application Ser. No. 60/951,024, filed on Jul. 20, 2007. The entire contents of all of the above-listed documents are incorporated herein by reference.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to data communication. More specifically, certain embodiments of the invention relate to a method and system for a handheld portable communication device for configuring connection to and use of local and remote resources.

BACKGROUND OF THE INVENTION

The field of wireless communication has seen dramatic growth the last few years. In today's world, most people use their wireless devices, be it cellular phones, PDA's, laptops, and/or other devices, for various purposes, business and personal, on a constant and daily basis. Society is truly becoming a wireless one. Many wireless solutions have been introduced, and have made tremendous strides into everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS, UMTS, and CDMA2000 may incorporate substantial data capabilities. Most of today's cellular services may include such features as text messaging, video streaming, web browsing . . . etc.

Combining various wireless technologies is another trend in the wireless world. For instance, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal may also be connected to a campus-wide WLAN network through an access point (AP) located within the building. Also, cellular technology may allow use of the mobile phone as a form of wireless modem that allows connecting a laptop, for example, to the internet via a cellular network.

In short, wireless networks may exist to support handheld wireless communication devices (HWCDs). However, while HWCDs have continued to grow in complexity and capability, these HWCDs still continue to suffer from some major limitations, especially physical limitations and power.

Just as with other electronic devices, the HWCDs have seen substantial growth in performance capability and speed. As such, they are finding applications in areas not predicted when first introduced to give users mobile telephony. They may comprise mini computers, multimedia players, GPS devices and many other applications, for example. As more and more applications are added to wireless devices, the need for integration of services becomes greater.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a handheld portable communication device for configuring connection to and use of local and remote resources, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a handheld portable communication device for configuring connection to and use of local and remote resources. Exemplary aspects of the invention include discovering available networks and resources and establishing a route between the handheld wireless communication device and selected resources. The route may be established over selected one or more of the available networks based on user preference criteria stored in the handheld wireless communication device. Once the route has been established, multimedia data may be communicated between the handheld wireless communication device and the selected one or more of the available resources. The established route may be dynamically adjusted, based on network availability and bandwidth. The handheld wireless communication device may communicate utilizing a plurality of wireless protocols. The preference criteria stored in the handheld wireless communication device may be dynamically adjusted. The resources may be local or remote to the handheld wireless communication device.

Figure 1A:
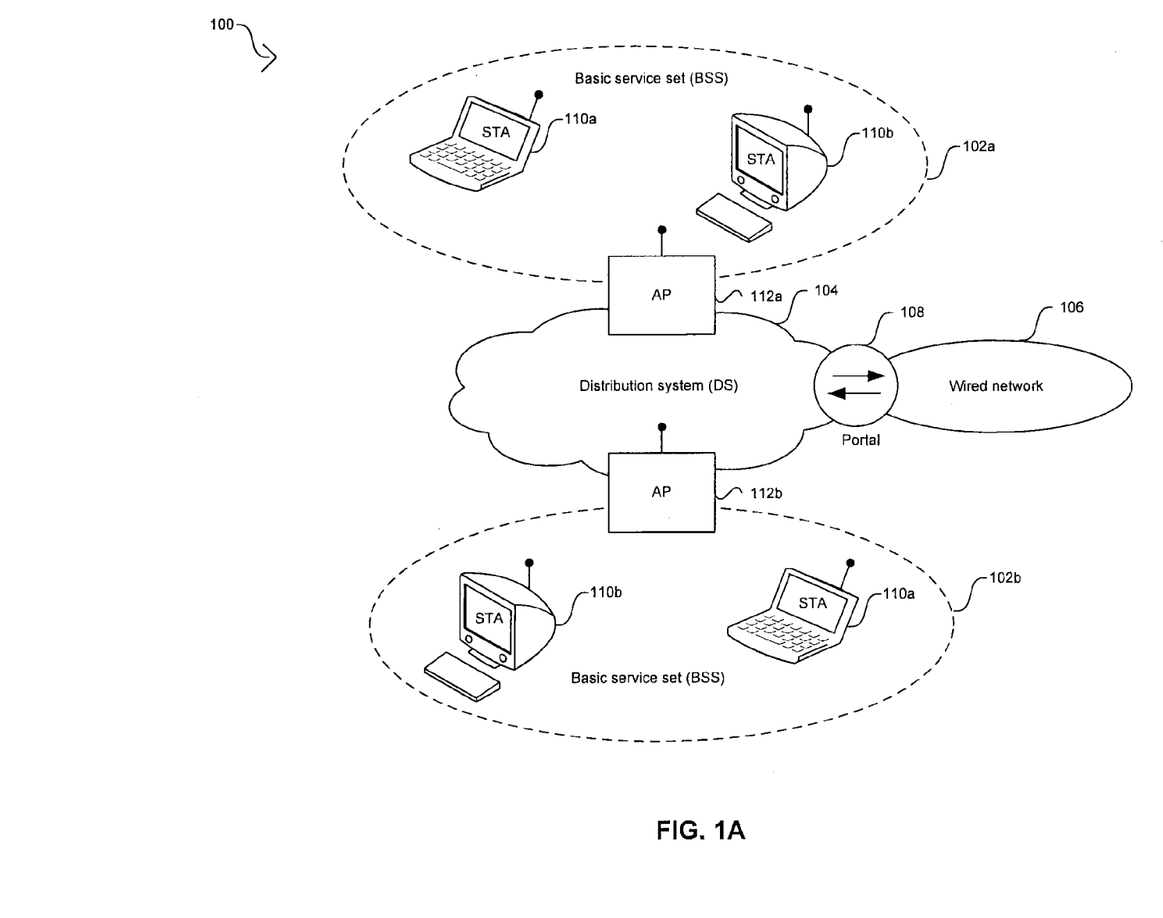
FIG. 1A is a block diagram of an exemplary WLAN infrastructure network comprising basic service sets (BSSs) integrated using a common distribution system (DS), in accordance with an embodiment of the invention.

FIG. 1A is a block diagram of an exemplary WLAN infrastructure network comprising basic service sets (BSSs) integrated using a common distribution system (DS), in accordance with an embodiment of the invention. Referring to FIG. 1A, the exemplary WLAN infrastructure network 100 shown may comprise a first BSS 102a, a second BSS 102b, a DS 104, a wired network 106, a portal 108, a first access point (AP) 112a, a second AP 112b, and a plurality of WLAN stations 110a and 110b. The BSSs 102a and 102b may represent a fundamental building block of the IEEE 802.11 (WLAN) architecture and may be defined as a group of stations that are under the direct control of a single coordination function. The geographical area covered by a BSS is known as the basic service area (BSA). The DS 104 may be utilized to integrate the BSSs 102a and 102b and may comprise suitable hardware, logic, circuitry, and/or code that may be adapted to operate as a backbone network that is responsible for Medium Access Control (MAC) level transport in the WLAN infrastructure network 100. The DS 104, as specified by the IEEE 802.11 standard, may be implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 may be logically different from the BSSs and may be utilized only to transfer packets between the BSSs and/or to transfer packets between the BSSs and the wired network 106.

The wired network 106 may comprise suitable hardware, logic, circuitry, and/or code that may be adapted to provide wired networking operations. The wired network 106 may be accessed from the WLAN infrastructure network 100 via the portal 108. The portal 108 may comprise suitable hardware, logic, circuitry, and/or code and may be adapted to integrate the WLAN infrastructure network 100 with non-IEEE 802.11 networks. Moreover, the portal 108 may also be adapted to perform the functional operations of a bridge, such as range extension and/or translation between different frame formats, in order to integrate the WLAN infrastructure network 100 with IEEE 802.11-based networks.

The APs 112a and 112b may comprise suitable hardware, logic, circuitry, and/or code that may be adapted to support range extension of the WLAN infrastructure network 100 by providing the integration points necessary for network connectivity between the BSSs. The WLAN stations 110a and 110b correspond to WLAN-enabled terminals that comprise suitable hardware, logic, circuitry, and/or code that may be adapted to provide connectivity to the WLAN infrastructure network 100 via the APs 112a and 112b. The WLAN station 110a shown is a laptop computer and may correspond to a mobile station or terminal within the BSS and the WLAN station 110b shown is a desktop computer and may correspond to a fixed or stationary terminal within the BSS. Each BSS may comprise a plurality of mobile or fixed stations and may not be limited to the exemplary implementation shown in FIG. 1A.

A handheld wireless communication device (HWCD) user may wish to utilize home-based resources while within a BSA, or may wish to access other WLAN stations within the BSA. The establishment of such a connection utilizing a HWCD may require a dynamic routing capability and built-in knowledge of user preferences and access privileges.

Figure 1B:
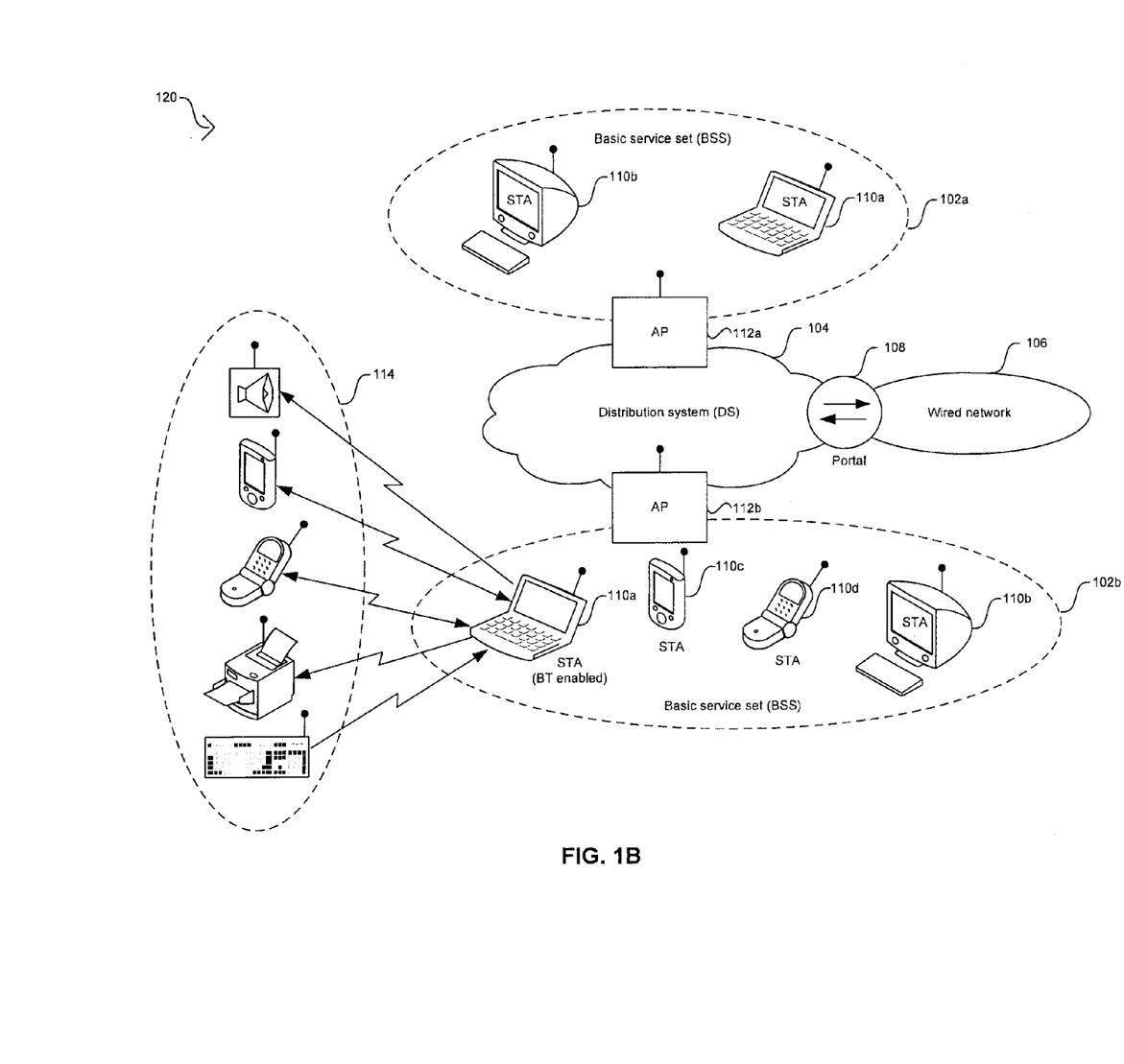
FIG. 1B is a block diagram of an exemplary WLAN infrastructure network comprising a basic service set (BSS) with stations that support WLAN/Bluetooth coexistence, in accordance with an embodiment of the invention.

FIG. 1B is a block diagram of an exemplary WLAN infrastructure network comprising a basic service set (BSS) with stations that support WLAN/Bluetooth coexistence, in accordance with an embodiment of the invention. Referring to FIG. 1B, the exemplary WLAN infrastructure network 120 shown differs from the WLAN infrastructure network 100 in FIG. 1A in that at least one BSS comprises at least one station or terminal that supports Bluetooth technology. In this regard, the second BSS 102b comprises additional mobile terminals or stations such as a Personal Digital Assistant (PDA) 110c and a mobile phone 110d while the laptop computer 110a is now shown to be Bluetooth-enabled. The peripheral devices 114 shown may be part of the Wireless Personal Area Network (WPAN) supported by the Bluetooth-enabled laptop computer. For example, the laptop computer 110a may communicate via Bluetooth technology with a keyboard, a mouse, a printer, a mobile phone, a PDA, and/or a set of headphones or speakers, where these devices and the laptop computer 110a may form an ad-hoc Bluetooth piconet. Generally, a Bluetooth piconet may comprise a master device or terminal and up to seven slave devices or terminals. In this exemplary implementation, the laptop computer 110a may correspond to the master Bluetooth terminal and the peripheral devices 114 may correspond to the slave Bluetooth terminals.

The Bluetooth-enabled laptop computer 110a in FIG. 1B may comprise a WLAN radio device and a Bluetooth radio device that allows it to communicate with the WLAN infrastructure network 100 via the AP 112b and with the Bluetooth piconet respectively. Because of the size of the laptop computer 110*a*, locating the WLAN and BT radio devices in the same terminal may result in signal interference between WLAN and BT communications. When the PDA 110*c* and/or the mobile phone 110*d* are Bluetooth-enabled, the small form factor of these coexistence terminals may result in a small radio frequency (RF) path loss between WLAN and BT radio devices and likely interference between WLAN and BT communications.

A HWCD user may wish to utilize home-based resources while within an area with multiple wireless networks and protocols, or may wish to access devices utilizing other wireless protocols within the same area. The establishment of such a connection utilizing a single HWCD may require a dynamic routing capability, multi-protocol capability and built-in knowledge of user preferences and access privileges.

Figure 1C:
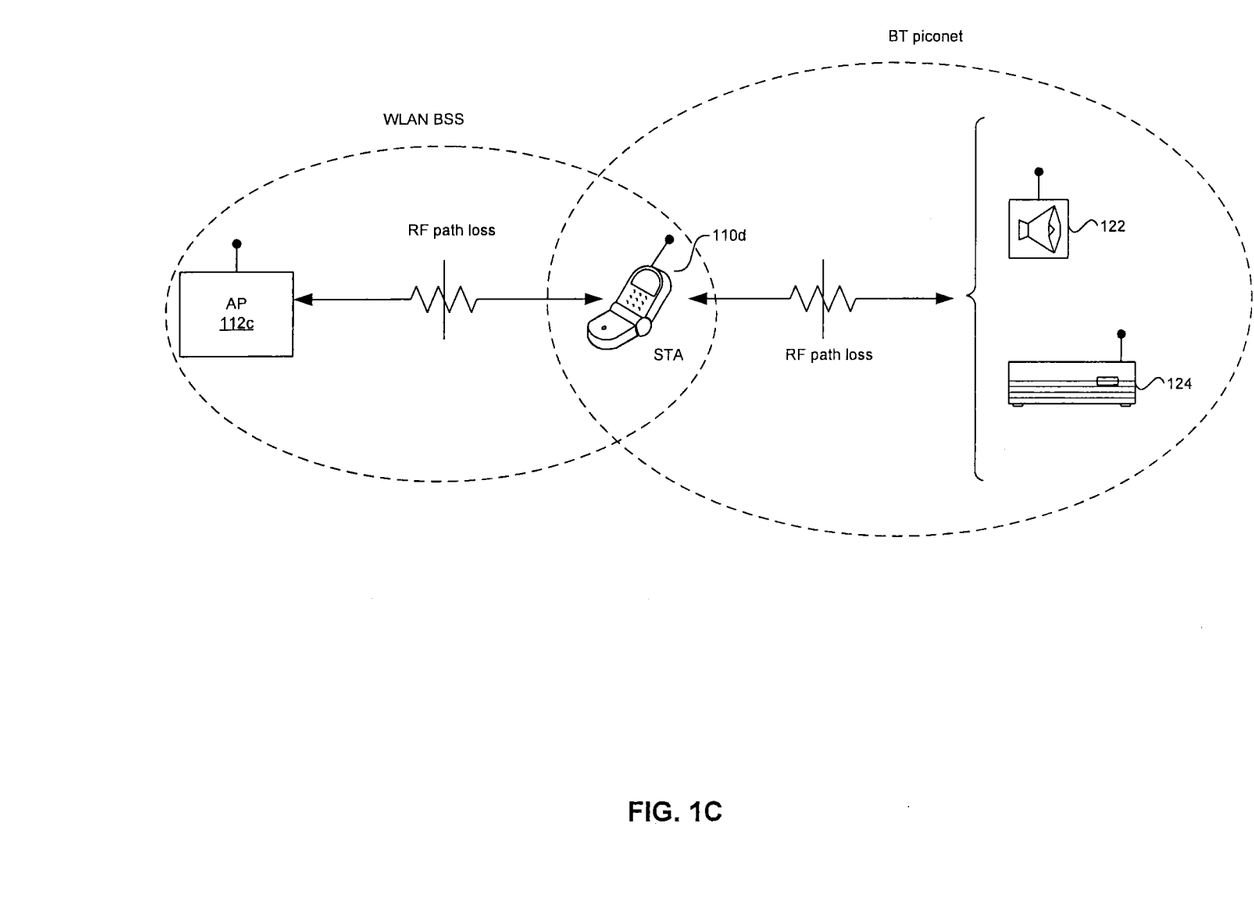
FIG. 1C is a block diagram that illustrates an exemplary usage model for a coexistence terminal with collocated WLAN and Bluetooth radio devices, in accordance with an embodiment of the invention.

FIG. 1C is a block diagram that illustrates an exemplary usage model for a coexistence terminal with collocated WLAN and Bluetooth radio devices, in accordance with an embodiment of the invention. Referring to FIG. 1C, the mobile phone 110*d* may comprise a WLAN radio device to communicate with the AP 112*c*. The mobile phone 110*d* may also be Bluetooth-enabled and may comprise a Bluetooth radio device to communicate with, for example, a Bluetooth headset 122 and/or a home gateway 124 with Bluetooth cordless telephony capability. Due to the small form factor of the mobile phone 110*d*, the WLAN and Bluetooth radio devices may be in such close proximity to each other within the same coexistence terminal that the isolation between them is sufficiently low to allow desensitization of one radio device by the other's transmissions.

The Bluetooth-enabled mobile phone 110*d* may comprise two maximum transmission power levels. For example, the mobile phone 110*d* may operate as a Class 1 power level terminal with a maximum transmission power of 20 dBm to communicate with the home gateway 124. In another example, the mobile phone 110*d* may operate as a Class 2 power level terminal with a maximum transmission power of 4 dBm to communicate with the Bluetooth headset 122. The Bluetooth headset 122 may comprise suitable hardware, logic, circuitry, and/or code that may be adapted to receive and/or transmit audio information. For example, the Bluetooth headset 122 may be adapted to receive and/or transmit Continuous Variable Slope Delta (CVSD) modulated voice from the mobile phone 110*d* or receive A2DP, such as MP3, from the mobile phone 110*d*. The home gateway 124 may comprise suitable hardware, logic, circuitry, and/or code that may be adapted to receive and/or transmit data and/or audio information. For example, the home gateway 124 may receive and/or transmit 64 kb/s CVSD modulated voice.

In operation, the mobile phone 110*d* may receive voice or audio content from the WLAN infrastructure network via the AP 112*c* and may communicate the voice or audio contents to the Bluetooth headset 122 or the voice contents to the home gateway 124. Similarly, the Bluetooth headset 122 the home gateway 124 may communicate voice contents to the Bluetooth-enabled mobile phone 110*d* which in turn may communicate the voice contents to other users through the WLAN infrastructure network.

A HWCD user may wish to utilize devices within multiple wireless networks and utilizing multiple protocols. The establishment of such a connection utilizing a single HWCD may require multi-protocol capability and built-in knowledge of user preferences and access privileges.

Figure 1D:
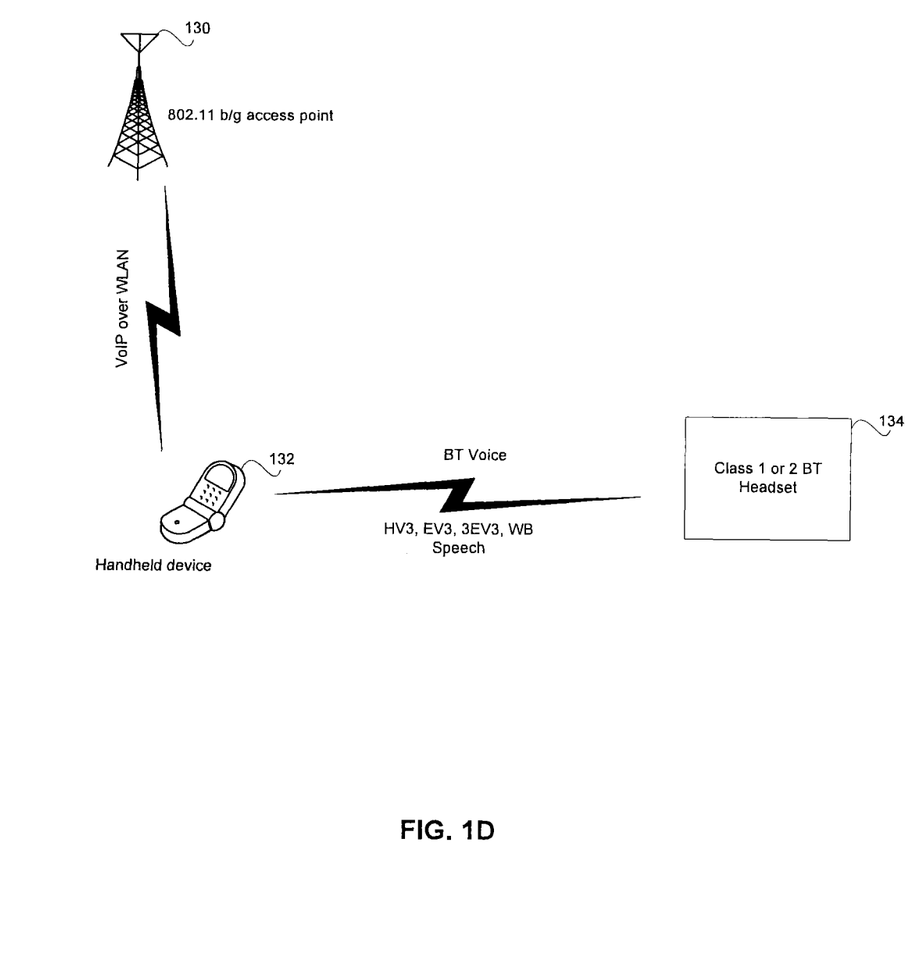
FIG. 1D is a block diagram that illustrates another embodiment of an exemplary usage model for a coexistence terminal with collocated WLAN and Bluetooth radio devices, in accordance with an embodiment of the invention.

FIG. 1D is a block diagram that illustrates another embodiment of an exemplary usage model for a coexistence terminal with collocated WLAN and Bluetooth radio devices, in accordance with an embodiment of the invention. Referring to FIG. 1D, there is shown an access point (AP) 130, a handheld wireless communication device (HWCD) 132 and a Bluetooth headset 134.

The AP 130 may comprise suitable hardware, logic, circuitry, and/or code that may be adapted to support range extension of the WLAN infrastructure network by providing the integration points necessary for network connectivity between the base stations. The HWCD 132 may comprise a WLAN radio device to communicate with the AP 130. The HWCD 132 may also be Bluetooth-enabled and may comprise a Bluetooth radio device to communicate with, for example, the Bluetooth headset 134. The Bluetooth headset 134 may comprise suitable hardware, logic, circuitry, and/or code that may be adapted to receive and/or transmit audio information.

The HWCD 132 may be coupled to the AP 130 via an 802.11 based (WLAN) wireless connection. The HWCD 132 may be coupled to the Bluetooth headset 134 via a Bluetooth (BT) connection between the HWCD 132 and the BT headset 134. The WLAN may be adapted to carry voice traffic that may be packetized into frames of 5 to 30 ms of voice, for example. These packetized frames may be encapsulated into standard real-time transport protocol (RTP) packets. The data packets may be transmitted over a network and reassembled to create a synchronous voice stream. The BT interface may be adapted to carry voice traffic with packetized frames, but the data may be processed as a synchronous pulse coded modulated (PCM) stream by the voice processor.

The HWCD 132 may comprise suitable hardware, logic, circuitry, and/or code that may be adapted to interface the voice processor and the Bluetooth controller. Command and control data may be passed through a serial interface known as a host controller interface (HCI). The HCl is, for example, a USB or UART interface. Voice data may be communicated either through a PCM interface or through the HCl.

The HWCD 132 may comprise suitable logic and/or code that may be adapted to communicate with the BT controller. At the lowest level, software may be utilized to control the UART and control lines such as the reset line to the BT controller and power control lines. Software may be utilized to communicate with the BT controller by allowing BT profiles to be implemented such as the headset profile. The BT controller may be adapted to communicate with the lower level software through abstraction layers such as the operating system (OS) independent kernel interface, for example. Application code may be utilized to control the headset provided by the headset profile.

In an embodiment of the invention, the application code may be adapted to translate commands from the user interface into application program interface (API) calls to enable the headset profile, pair the headset, establish or break a synchronous connection oriented (SCO) connection to the headset, and to change the volume of the headset. The application code may be adapted to communicate back events from the BT controller, such as success or failure at setting up the SCO connection. In an embodiment of the invention, the voice processing software may be adapted to determine where to send and receive its voice samples based on whether or not the BT headset 134 may be in use. For example, the samples may be routed to the PCM interface when the BT headset 134 may be in use, and to an internal audio block otherwise.

The exemplary usage model shown in FIG. 1D is an example of a HWCD utilizing a plurality of communication protocols. A HWCD user may wish to utilize devices within multiple wireless networks and utilizing multiple protocols. The establishment of such a connection utilizing a single HWCD may require multi-protocol capability and built-in knowledge of user preferences and access privileges.

Figure 2:
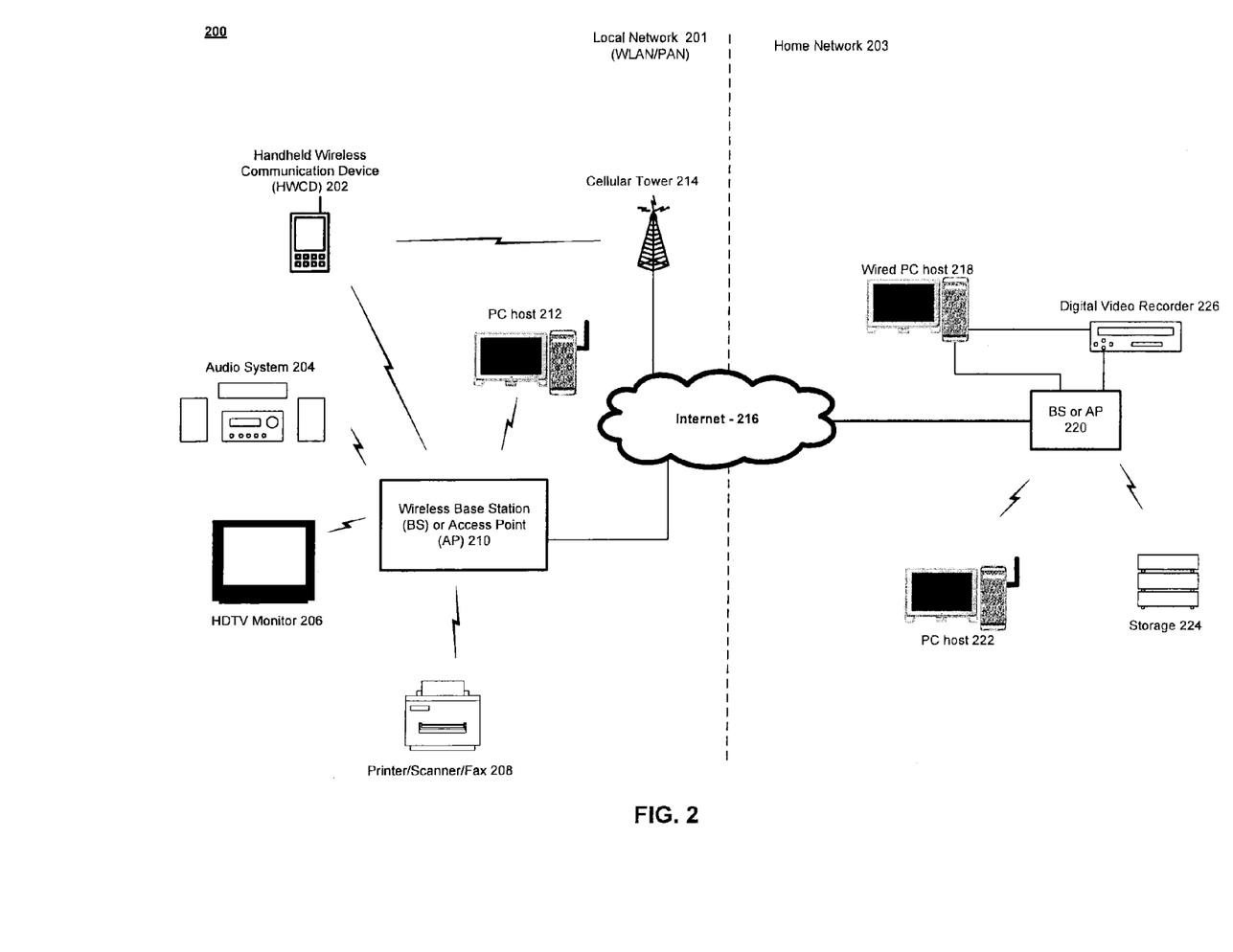
FIG. 2 is a block diagram illustrating a network connection configured by a mobile wireless communication device, in accordance with an embodiment of the invention.

FIG. 2 is a block diagram illustrating a network connection configured by a mobile wireless communication device, in accordance with an embodiment of the invention. Referring to FIG. 2, there is shown a handheld communication device configured network connection 200 comprising a local network 201 and a home network 203. The local network 201 may communicate with the home network 203 via the Internet 216. The local network 201 may comprise a handheld wireless communication device (HWCD) 202, an audio system 204, an HDTV monitor 206, a printer/scanner/fax 208 and a wireless base station or access point 210.

The home network 203 may comprise a wired host PC 218, a PC host 222, a storage 224, a wireless base station or access point 220 and a digital video recorder (DVR) 226. The devices coupled to the local network 201 and the home network 203 may be communicatively coupled to their respective base station or access point 210/220 via a wireless connection utilizing one of a plurality of protocols, such as Bluetooth©, Wi-Fi, wireless LAN 802.11, for example. The number of devices is not limited to the number shown in FIG. 2. Accordingly, any number of networked multimedia input/output devices may be utilized.

The HWCD 202 may comprise a device capable of communicating wirelessly utilizing a plurality of methods and/or protocols and over a plurality of networks. The HWCD 202 may function as a cellular phone, personal data assistant, and/or a handheld computing device, for example. In addition, the HWCD may function as a router, in that it may configure itself to use and connect to local and remote resources to perform multi-media and communication tasks by auto discovery of local devices and capabilities via standardized protocols. The HWCD 202 may locate nearby wired and/or wireless routers and establish routes to a requested destination. The HWCD 202 may establish a plurality of routes, based on user preferences, such as available bandwidth and quality of service (QoS), for example. These routes may be stored in routing tables, which may be stored locally on the HWCD 202, or remotely, such as on the storage 224, for example.

In operation, local devices to the handheld device may announce their capabilities and availability in instances when the HWCD 202 comes in range of them and discovers the wired or wireless network that links them. In another embodiment of the invention, the HWCD 202 may poll for available networks and resources. In this manner, the hand held device may maintain a list of local resources that it may communicate with along with their capabilities.

The HWCD 202 may keep a list of resources available on its home network and may update that list and the bandwidth capabilities of its connection to the home network 203 via locally available networks at all times. In instances when the user of the handheld device may wish to accomplish a certain multimedia or communications task, the HWCD 202 may configure the local and remote resources in order to accomplish the multimedia or communications task.

In one embodiment of the invention, the home network 203 resources may include a powerful PC, such as the wired PC host 218, with large amounts of storage and computing resources, including transcoding capabilities and local digital video storage. In addition, the HWCD 202 may be connected to a wireless network that includes an HDTV monitor 206 that may be available for use and have high bandwidth connectivity via the Internet to the home network 203. The HWCD 202 may create an ad hoc virtual network of devices from the home network 203 to the local network 201. This may provide a route for data to be streamed from a home video storage device, such as the DVR 226, for example, through the wired PC host 218 for transcoding to a different display format. The data may be communicated over the Internet 216 to the local network 201 and to the local HDTV monitor 206 for display. The HWCD 102 may also configure the ad hoc virtual network and the audio system 204 to play audio that corresponds to the video playing on the HDTV monitor 206.

The ad hoc network and linking of resources described above may be made possible by the HWCD 202 creating and updating its list of local and remote resources whenever network locality changes. The discovery of local resources could be made by listening to and logging announcement messages that detail resources and their capabilities or by querying new local networks for available resources. One or both of these functions may be accomplished with standardized protocols.

In an exemplary aspect of the invention, the HWCD 202 may be within range of a WLAN, such as the local network 201. The HWCD 202 user may wish to stream video on the HDTV monitor 206 and audio for the video on the audio system 204, both from a data source, such as the storage 224, or the DVR 226, on the home network 203, for example. The HWCD 202 may determine whether the WLAN, the local network 201, may be in its list of accessible networks. The HWCD 202 may also have stored usernames, passwords and wireless protocols, for example, of the local network 201. In instances when the HWCD 202 may not have the local network 201 in its stored database of networks and resources, the HWCD 202 may receive information that the network 201 may broadcast, such as the network system ID, which may comprise information about the wireless protocol, speed and access rights, for example.

The HWCD 202 may establish a route from the HWCD 202, through the BS or AP 210, through the Internet 216, to the BS or AP 220, to the storage 224 and/or DVR 226, and back to the local network 201 and the HDTV monitor 206 and the audio system 204. The HWCD 202 may determine that the format of the video stored on the storage 224 and/or the DVR 226 may not be appropriate for the HDTV monitor 206. In this instance, the HWCD 202 may direct the data through the wired PC host 218, which may transcode the video file to a suitable format to be played on the HDTV monitor 206.

The HWCD 202 may have stored information on the available resources in the local network 201 and the home network 203, or if not, may poll or discover the network for resources and their characteristics. In this manner, the stored network and resource data may be continuously updated. In addition to storing lists of networks and resources available, the HWCD 202 may also store preferences, such as the type of networks the user may have access to, and the preferred protocol to utilize if a plurality of protocols may be available, for example. In instances where the HWCD 202 may be utilizing a cellular network, such as through the cellular tower 214, and the HWCD 202 moves into an area where a WLAN may be available, such as through the BS or AP 210, and the HWCD 202 stored preferences indicate the WLAN is preferred over the cellular network, the HWCD 202 may switch over to the WLAN.

The HWCD 202 may build the ad hoc network based on the user's request for a particular function and the availability of resources. For example, there may be multiple display devices available in a local network, such as the small screen on the HWCD 202 and a larger networked display, such as the HDTV monitor 206. The HWCD 202 may pick the best means of displaying the content based on the bandwidth of the various heterogeneous networks that may be traversed, the requirement and availability of transcoding resources, and the battery power available on the handheld device. In instances where there may be sufficient battery and CPU resources available in the HWCD 202, the HWCD 202 may choose to perform the transcoding functions locally. Or if transcoding may not be available, the HWCD 202 may display the content on a display appropriate for that content.

Figure 3:
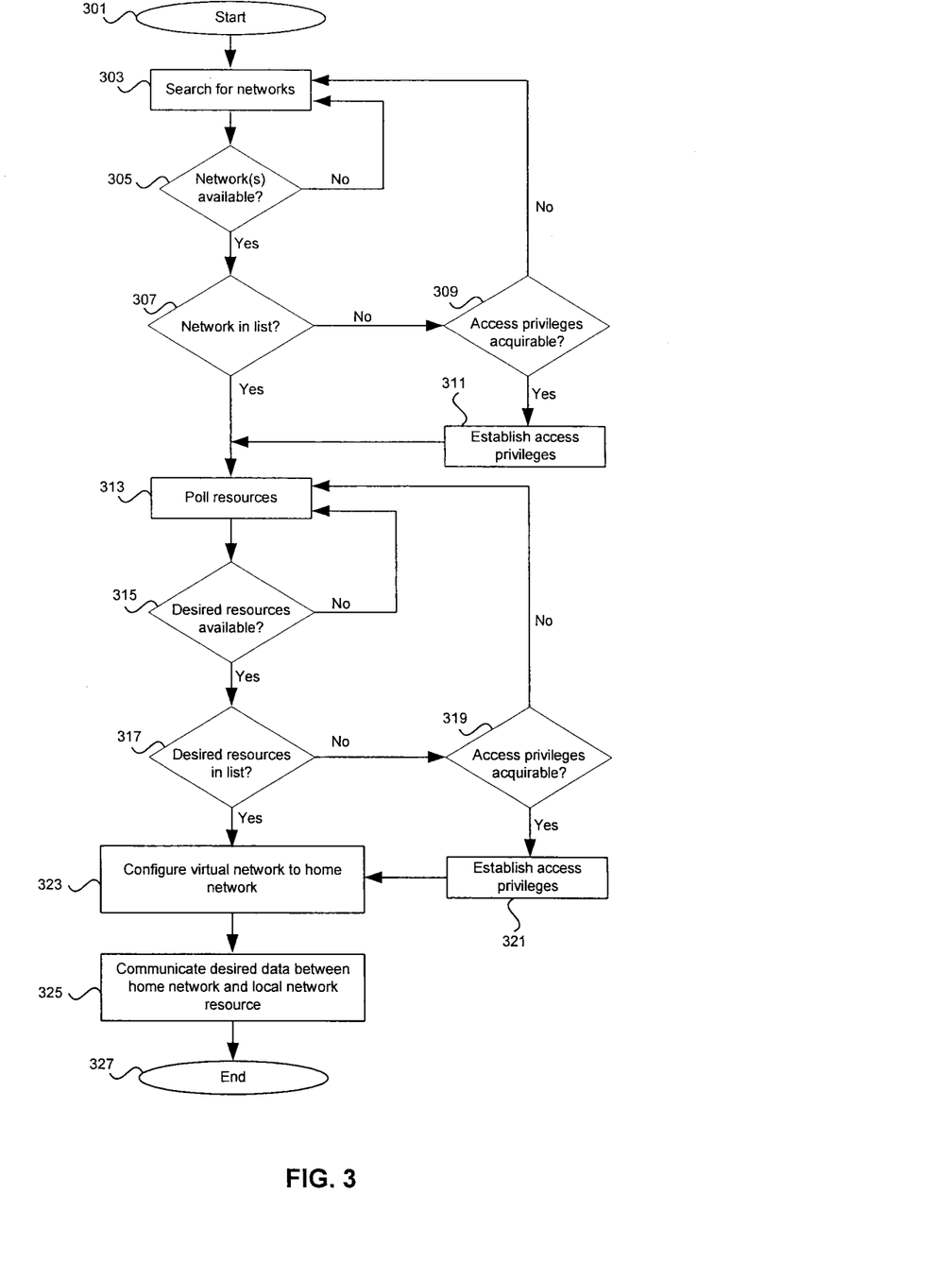
FIG. 3 is a flow diagram illustrating exemplary steps for the configuration of an ad hoc network connection utilizing a handheld wireless communication device, in accordance with an embodiment of the invention.

FIG. 3 is a flow diagram illustrating exemplary steps for the configuration of an ad hoc network connection utilizing a handheld wireless communication device, in accordance with an embodiment of the invention. Referring to FIG. 3, in step 303 following start step 301, the HWCD 202 may search for an available network or networks. If, in step 305, none are available, the HWCD 202 may step back to step 303 and continue to poll for available networks. If one or more networks are available, in step 307, the HWCD 202 may determine whether the network may be in a stored list of preferred networks. If the one or more found networks are not in the stored list, the process may proceed to step 309, where the HWCD 202 may determine if access privileges may be established. If they cannot, the process may return to step 303 to search further for available networks. In instances where access privileges may be established, the process may proceed to step 311 to establish the access privileges before proceeding to step 313 to poll for available resources.

If the one or more found networks are in the stored list, the process may proceed to step 313 where the HWCD 202 may poll for available resources. The available resources may comprise an HDTV monitor 206, an audio system 204, a printer/scanner/fax 208, or other computing and/or multimedia devices, for example. If, in step 315, no resources are found, the process may return to step 313 where the HWCD 202 may continue to poll available resources. If one or more resources may be found in step 315, the process may proceed to step 317. If, in step 317, the one or more found resources are not found in a stored list of resources, the process may proceed to step 319, where the HWCD 202 may determine if access privileges are acquirable. If access privileges are not acquirable, the process may return to step 313, where the HWCD 202 may continue to poll for available resources. If, in step 319, access privileges may be acquired for the one or more available resources, the process may proceed to step 321 where the HWCD 202 may establish access privileges, and store the device in the list of resources, followed by step 323, where the virtual network between the home network 203 and the local network 201 may be established.

If, in step 317, the one or more found resources are in a stored list of preferred devices, the process may proceed to step 323, where the HWCD 202 may configure a virtual network from a local network 201 to a home network 203 and then proceed to step 325 for the communication of data between local network 201 and home network 203 resources, followed by end step 327.

In an embodiment of the invention, a method and system are disclosed for discovering available networks 201 and 203 and resources 204, 206 and 208, establishing a route between the handheld wireless communication device (HWCD) 202 and a selected one or more of the available resources 204, 206 and 208 via a selected one or more of the available networks 201 and 203 based on user preference criteria stored in the HWCD 202, and communicating multimedia data between the HWCD 202 and the selected one or more of the available resources 204, 206 and 208 via the established route. The established route may be dynamically adjusted, based on network availability and bandwidth. The HWCD 202 may communicate utilizing a plurality of wireless protocols. The preference criteria stored in the HWCD 202 may be dynamically adjusted. The resources may be local or remote to the HWCD 202.

Certain embodiments of the invention may comprise a machine-readable storage having stored thereon, a computer program having at least one code section for data communication, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:
1. A method for data communication, the method comprising:
    discovering, in a communication device, a list of local networks and nodes accessible by the communication device;

storing, in the communication device, at least one data format and at least one communication protocol associated with at least one node of at least one remote network and storing, in the communication device, at least one data format and at least one communication protocol associated with at least one node of the local networks;

configuring an ad hoc network including the at least one remote network and one of the local networks, such that a communication path is established between a first node for which at least one data format and at least one communication protocol is stored in the communication device in association with the remote network and a second node for which at least one data format and at least one communication protocol is stored in the communication device in association with the one of the one of the local networks;

confirming, in the communication device, that the at least one data format and the at least one communication protocol stored in association with the first node are compatible with the at least one data format and the at least one communication protocol stored in association with the second node; and controlling the transmission of data between the first node and the second node through the ad hoc network via the communication path, wherein the first node and the second node are separate from the communication device.

2. The method according to claim 1, wherein the method further includes:
storing authentication data required to access the at least one remote network and nodes available in the at least one remote network, wherein
the discovering includes storing authentication data required to access the local networks and nodes.

3. The method according to claim 1, wherein
the discovering includes receiving a message from at least one local network or node describing the at least one local network or node.

4. The method according to claim 1, wherein the configuring includes configuring the ad hoc network including a selected remote network and a selected one of the local networks.

5. The method according to claim 4, wherein the method further comprises
storing, in the communication device, preference criteria to determine the selected remote network and the selected one of the local networks;
storing, in the communication device, data formats and communication protocols associated with the nodes available in the at least one remote network and the local networks and nodes; and
establishing the communication path such that data formats and communication protocols associated with nodes and networks along the communication path are compatible.

6. The method according to claim 1, wherein the communication path is established such that the data is transcoded into a required data format by a node other than the first node and the second node along the communication path.

7. A communication device, comprising:
circuitry configured to
discover a list of local networks and nodes accessible by the communication device;
store, in the communication device, at least one data format and at least one communication protocol associated with at least one node of at least one remote network and storing, in the communication device, at least one data format and at least one communication protocol associated with at least one node of the local networks;
configure an ad hoc network including the at least one remote network and one of the local networks, such that a communication path is established between a first node for which at least one data format and at least one communication protocol is stored in the communication device in association with the remote network and a second node for which at least one data format and at least one communication protocol is stored in the communication device in association with the one of the one of the local networks;
confirm that the at least one data format and the at least one communication protocol stored in association with the first node are compatible with the at least one data format and the at least one communication protocol stored in association with the second node; and
control the transmission of data between the first node and the second node through the ad hoc network via the communication path,
wherein the first node and the second node are separate from the communication device.

8. The communication device according to claim 7, wherein the circuitry is further configured to
store authentication data required to access the at least one remote network and nodes available in the at least one remote network, wherein
the circuitry stores authentication data required to access the local networks and nodes when the circuitry discovers the list of local networks and resources.

9. The communication device according to claim 7, wherein
the circuitry is further configured to receive a message from at least one local network or nodes describing the at least one local network or resource.

10. The communication device according to claim 7, wherein the circuitry is further configured to configure the ad hoc network including a selected remote network and a selected one of the local networks.

11. The communication device according to claim 10, wherein the circuitry is further configured to
store criteria to determine the selected remote network and the selected one of the local networks;
store data formats and communication protocols associated with the nodes available in the at least one remote network and the local networks and nodes; and
establish the communication path such that data formats and communication protocols associated with nodes and networks along the communication path are compatible.

12. The communication device according to claim 7, wherein the communication path is established such that the data is transcoded into a required data format by a node other than the first node and the second node along the communication path.

13. A non-transitory computer-readable storage medium storing computer-readable instructions thereon, which, when executed by a communication device, cause the communication device to perform a method for data communication, the method comprising:
discovering, in a communication device, a list of local networks and nodes accessible by the communication device;
storing, in the communication device, at least one data format and at least one communication protocol associated with at least one node of at least one remote network and storing, in the communication device, at least one data format and at least one communication protocol associated with at least one node of the local networks;

configuring an ad hoc network including the at least one remote network and one of the local networks, such that a communication path is established between a first node for which at least one data format and at least one communication protocol is stored in the communication device in association with the remote network and a second node for which at least one data format and at least one communication protocol is stored in the communication device in association with the one of the one of the local networks;

confirming that the at least one data format and the at least one communication protocol stored in association with the first node are compatible with the at least one data format and the at least one communication protocol stored in association with the second node; and controlling the transmission of data between the first node and the second node through the ad hoc network via the communication path, wherein the first node and the second node are separate from the communication device.

14. The non-transitory computer-readable storage medium according to claim 13, wherein the method further includes:

storing authentication data required to access the at least one remote network and nodes available in the at least one remote network, wherein the discovering includes storing authentication data required to access the local networks and nodes.

15. The non-transitory computer-readable storage medium according to claim 13, wherein the discovering includes receiving a message from at least one local network or node describing the at least one local network or node.

16. The non-transitory computer-readable storage medium according to claim 13, wherein the configuring includes configuring the ad hoc network including a selected remote network and a selected one of the local networks.

17. The non-transitory computer-readable storage medium according to claim 16, wherein the method further comprises storing, in the communication device, preference criteria to determine the selected remote network and the selected one of the local networks;

storing, in the communication device, data formats and communication protocols associated with the nodes available in the at least one remote network and the local networks and nodes; and establishing the communication path such that data formats and communication protocols associated with nodes and networks along the communication path are compatible.

18. The non-transitory computer-readable storage medium according to claim 13, wherein the communication path is established such that the data is transcoded into a required data format by a node other than the first node and the second node along the communication path.

* * * * *